US007124526B2

(12) United States Patent
Keach

(10) Patent No.: US 7,124,526 B2
(45) Date of Patent: Oct. 24, 2006

(54) OVERHEAD HIGHWAY BILLBOARD AND MARKETING METHOD

(76) Inventor: Eckley Keach, 520 S. Fourth St., Las Vegas, NV (US) 89101-6593

( * ) Notice: Subject to any disclaimer, the term of this patent is extended or adjusted under 35 U.S.C. 154(b) by 0 days.

(21) Appl. No.: 10/758,005

(22) Filed: Jan. 16, 2004

(65) Prior Publication Data

US 2004/0128891 A1 Jul. 8, 2004

Related U.S. Application Data

(60) Provisional application No. 60/478,913, filed on Jun. 16, 2003.

(51) Int. Cl.
*G06F 19/00* (2006.01)

(52) U.S. Cl. ...................................... 40/612; 40/606.18

(58) Field of Classification Search .................. 40/612, 40/607.11, 606.18
See application file for complete search history.

(56) References Cited

U.S. PATENT DOCUMENTS 2,052,771 A * 9/1936 Johnson ....................... 40/617
2,765,554 A * 10/1956 Anderson et al. ............. 40/612
3,102,352 A 9/1963 White
3,159,243 A * 12/1964 Henderson .................. 182/150
3,564,783 A * 2/1971 Dunne ........................... 52/38
4,015,349 A * 4/1977 Dunne ......................... 40/473
5,725,186 A 3/1998 Hillstrom et al.
6,003,827 A 12/1999 Kulp et al.
6,124,647 A * 9/2000 Marcus et al. ............. 307/10.1
6,202,369 B1 3/2001 Partee et al.
6,209,598 B1 * 4/2001 Petrey ........................ 150/154
2002/0038523 A1 * 4/2002 Gibbens ...................... 40/586

OTHER PUBLICATIONS

Picture A and B of an overhead sign structure, as prepared by an examner, on a roadway (I-395, sourthbound and northbound) and Diagram of roadway depicted in Pictures A and B.*
Copy of article by Cary Clack, "Graffiti Enthusiasts Defy the Law, Justice—and Also Gravity", San Antonio Express-News (Texas), Jul. 28, 2003, p. 1B.
Copy of article by Maureen Graham et al., "Billboard Firm Wins Approval", Philadelphia Inquirer (Chester Edition), Sep. 25, 2003, p. B07.
Copy of article by Steve Penn, "Put these 'artists' to work," Kansas City Star (Kansas & Missouri), Sep. 24, 1998, p. 2.

* cited by examiner

*Primary Examiner*—Cassandra Davis
(74) *Attorney, Agent, or Firm*—Wiley Rein & Fielding LLP

(57) ABSTRACT

A billboard advertising system is disclosed. The billboard advertising system includes an overhead sign structure at least partially traversing a roadway, said overhead sign structure having forward and rearward faces relative to oncoming vehicle traffic of the roadway. The forward face of the overhead sign structure has traffic information as part of a government regulated traffic information system directed in a primary orientation toward the oncoming vehicle traffic. The rearward face of the overhead sign structure on an opposing side from the forward face has a secondary orientation with respect to other traffic flow different from the oncoming vehicle traffic. A billboard advertisement is positioned on the rearward face of the overhead sign structure with visual exposure to the other traffic flow.

19 Claims, 5 Drawing Sheets

OVERHEAD HIGHWAY BILLBOARD AND MARKETING METHOD

This application claims priority benefit of U.S. provisional application No. 60/478,913, filed Jun. 16, 2003, the entire contents of which are incorporated herein by reference.

FIELD OF THE INVENTION

The present invention relates generally to business and marketing methods for advertising on billboards along primary roadways. More particularly, the present invention pertains to a method for placing billboard advertisements in an overhead location along the roadway.

BACKGROUND AND RELATED ART

At the heart of the free enterprise system is the basic activity of marketing. Many potentially viable products that have significant value have failed to reach the marketplace simply because of ineffective or inadequate marketing. Without knowledge of the product, the consumer has no incentive or means to give consideration to purchasing a product. Marketing provides the system for educating the consumer both as to the need and the corresponding product solution.

One marketing approach that is as old as commerce itself is the process of placing advertisements on signs that are positioned along thoroughfares of traffic. Such signs are typically classified by their intended audience, which is usually a function of audience size. For example, signs along walkways are usually small in size because the audience consists of individual persons passing at a rather slow pace. These include signs in store windows along sidewalks and city streets, where both pedestrians and passengers in automobiles are able to glance at the sign and capture a basic message. Such signs depend upon a slow rate of speed to enable the audience to linger on its content for sufficient time to read and understand the advertisement. Effective locations of such signs are generally limited to concentrated areas of population within cities where the audience is primarily pedestrian traffic or in slow-moving vehicles.

An interesting variation of such small-sign advertising is disclosed in U.S. Pat. No. 3,102,352, by L. L. White. This patent discusses placing small signs at intersections on the back of stop signs, enabling the use of the stop sign as a support device for the advertisement. This is consistent with small-sign advertising because the sign locations are within cities where traffic speeds are slow. Furthermore, vehicle traffic is accustomed to slowing down at intersections, particularly where stop signs are present. Accordingly, small-sign advertising may be effective at these locations.

A different category of marketing is the large-sign advertisement, typically referred to as billboard advertising. Billboards are designed for use along high-speed roadways and other areas where the audience size may be classified as large, enabling a mass marketing approach. In these situations, marketing strategies are quite different from the small-sign environment because the message must be very concise and focused, otherwise the vehicle occupant is gone before there is opportunity to grasp the purpose of the ad. Graphic content of the billboard must be very large to be visible, and configured to attract attention in the blink of an eye. Accordingly, both the logistics and content of billboard advertising require a different mentality in design, construction and use, as compared to other marketing techniques.

Because of the large spatial requirements of billboards, significant controversy has developed because of adverse environmental impact. Some communities oppose billboards, desiring to preserve the aesthetic appeal of the natural environment surrounding the roadways. Many businesses, however, rely on billboard advertising to access consumers as part of their marketing program. Obviously, each side of this debate has strong points that deserve consideration. It is apparent that excessive use of billboards blocks the visual access of the public to natural surroundings, frequently limiting the enjoyment of trees, gardens, and other natural highlights. It is also recognized that such advertising stimulates sales, leading to more jobs and a healthy economy—an interest clearly important to the public welfare. As a consequence, the use of billboards is typically regulated by federal and local government through zoning requirements that attempt to balance the validity of each side of the issue.

It is apparent that there has been a long-existing need for alternative marketing methods to accommodate the valuable commercial resource of highway advertising, while at the same time protecting the aesthetic beauty of natural resources.

SUMMARY OF THE INVENTION

In one aspect, the present invention offers prime advertising location for billboard marketing without requiring placement of billboard structures along the roadside. One advantage of the invention is that no additional obstructions of natural attractions are created.

In another general aspect, the invention provides a method of billboard advertising. The method includes identifying a roadway having high-speed traffic and including an overhead sign structure at least partially traversing the roadway. A forward face of the overhead sign structure is identified, having traffic information as part of a government regulated traffic information system directed in a primary orientation toward oncoming vehicle traffic. A rearward portion of the overhead sign structure on an opposing side from the forward face is also identified, said rearward portion having a secondary orientation with respect to other traffic flow different from the oncoming vehicle traffic. The method also includes placing a billboard advertisement on the rearward portion of the overhead sign structure with exposure to the other traffic flow.

The invention also provides a billboard advertising system. The billboard advertising system includes an overhead sign structure at least partially traversing a roadway, the overhead sign structure having forward and rearward faces relative to oncoming vehicle traffic of the roadway. The forward face of the overhead sign structure has traffic information as part of a government regulated traffic information system directed in a primary orientation toward the oncoming vehicle traffic. The rearward face of the overhead sign structure on an opposing side from the forward face has a secondary orientation with respect to other traffic flow different from the oncoming vehicle traffic. A billboard advertisement is positioned on the rearward portion or face of the overhead sign structure with visual exposure to the other traffic flow.

As used herein, billboard advertising refers to pictures, messages, printed matter, electronic images, or other media designed for a commercial purpose and/or marketing purpose and/or including commercial, marketing, advertising information or messages. The billboard advertising of this invention specifically does not include solely artistic work, graffiti, government or municipal information, traffic signs, highway information, weather information, or safety information. Overhead billboard advertising of this invention refers to the use of an existing highway sign, where the existing sign traverses over one or more lanes of traffic and contains information on only the one side (forward face) facing oncoming traffic. Alternatively, overhead billboard advertising of this invention refers to the use of the reverse side of a new highway sign. The invention involves the use of the reverse side (opposing or rearward side or face, or rearward orientation) for commercial, advertising and/or marketing purposes. In general, the device(s) used on an opposing side to affix a billboard advertising to the overhead structure is of a type at least as secure as is used for the forward facing sign but can be designed to allow the advertising to be replaced, changed, or removed. For example, billboards or commercial, marketing, or advertising information can be inserted into a securely fastened frame on the overhead sign structure, where the insertion allows replacement. The securely fastened frame can be designed to be covered by vinyl, plastic, canvas or some other easily removable and replaceable product. The covering is easily fastened to, or removed from, the securely fastened frame as needed when the advertisement or message is changed. In this way the advertisement or message can be placed on the covering offsite and the covering brought to the overhead sign location, where the securely fastened frame has already been attached. The existing covering with the advertisement or message can be removed and taken away and the covering with the new, updated advertisement or message attached to the frame. Thus, changing or updating information on the advertisement or message can be performed quickly and easily. Another way of changing the advertisement or message is the use of electronic screens, many examples of which are available, which can be remotely programmed or controlled.

Thus, in a general advantage of the invention, the opposing side of an existing overhead sign (or the reverse side of a new overhead sign) traversing a highway or roadway can be used for commercial advertising in a manner billboards are currently used for advertising and in such a way as to require no additional obstruction of the natural or aesthetic environment or construction of billboards along the side or near the side of a roadway or highway. To date, no other commercial and/or advertising uses for the opposing side of an existing overhead sign have been described and neither have the methods of the invention described herein.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1(*a*) depicts the forward face of an existing overhead highway sign and FIG. 1(*b*) depicts the rearward face (rearward portion or opposing side) of the same overhead sign.

DETAILED DESCRIPTION

Figure 1A:
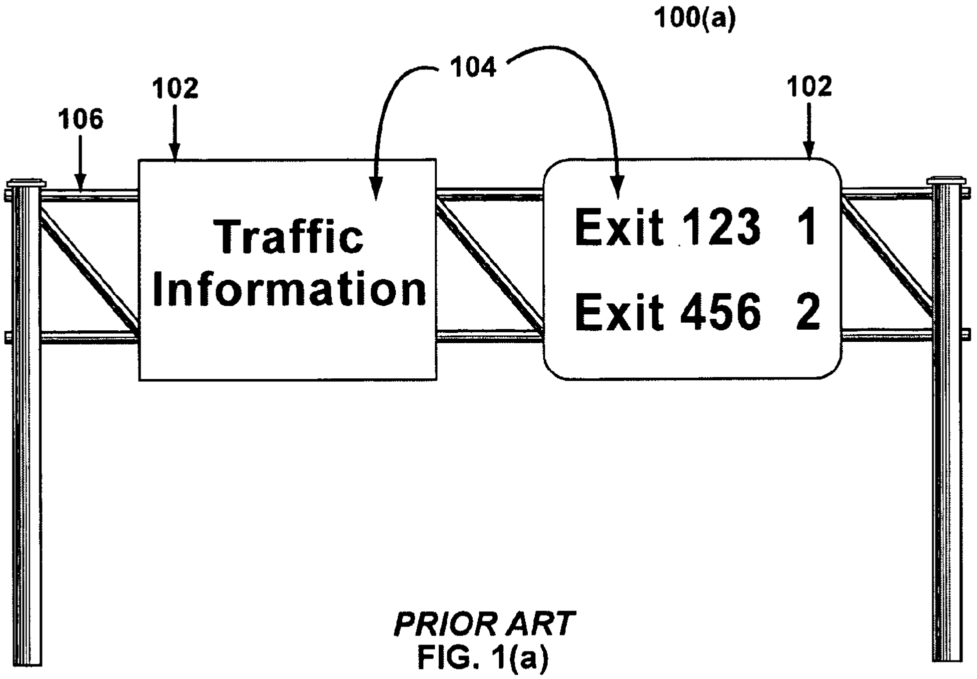
PRIOR ART FIG. 1(a)
FIGS. 1(*a*) and 1(*b*) depict an elevational, perspective view of a prior art freeway overhead sign structure as currently exists throughout the federal system.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention. The terms “roadway” and “highway” are used interchangeably throughout this description.

In the methods of the invention, the step of identifying a roadway including an overhead sign can comprise complying with local or applicable government authorities for billboard advertising in a particular area, city, county, or district, for example, within the United States. The identification of an optimum overhead sign can take into consideration the safety conditions of the roadway. The identification of the optimum overhead sign can also take into consideration the direction of traffic and the angle or view the traffic has of the opposing side of a particular overhead sign. Thus, a preferred secondary orientation of an overhead billboard advertisement or method of the invention will provide an unobstructed, clear, and/or safe view of the billboard advertising.

Furthermore, the step of placing a billboard advertisement on the opposing side of an identified overhead sign can occur once or multiple times so that an advertisement can be changed. In addition, when electronic billboards are used, the sign can be illuminated at only specific times of the day or be turned off so that no image is displayed. Placing the sign can also comprise using devices or equipment to ensure the safe use of the billboard advertising.

Figure 1B:
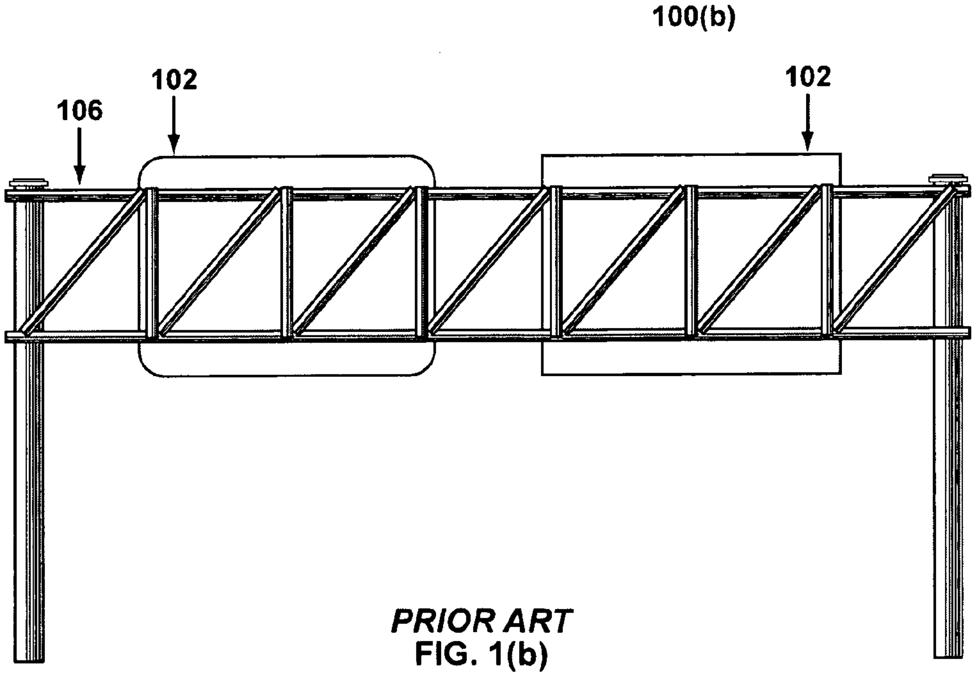
PRIOR ART FIG. 1(b)

As illustrated in FIGS. 1(*a*) and 1(*b*), overhead sign structures (100(*a*)) currently existing throughout the highway system normally consist of one or more signs (102) on the forward face (104) of the sign structure (106), each displaying traffic information. These signs are normally located above a roadway, and at least partially traverse the roadway. The traffic information often identifies distances to various destinations, roads, exists, and alternate routes for traffic flow based on governmental highway names or on names of destination locations. As illustrated in FIG. 1(*b*), most of the currently existing signs do not have any type of display on the rearward portion of the sign structure (100

(*b*)). In the rare case that a sign does have a display on their rearward portion, the display normally only consists of additional traffic information.

Figure 2:
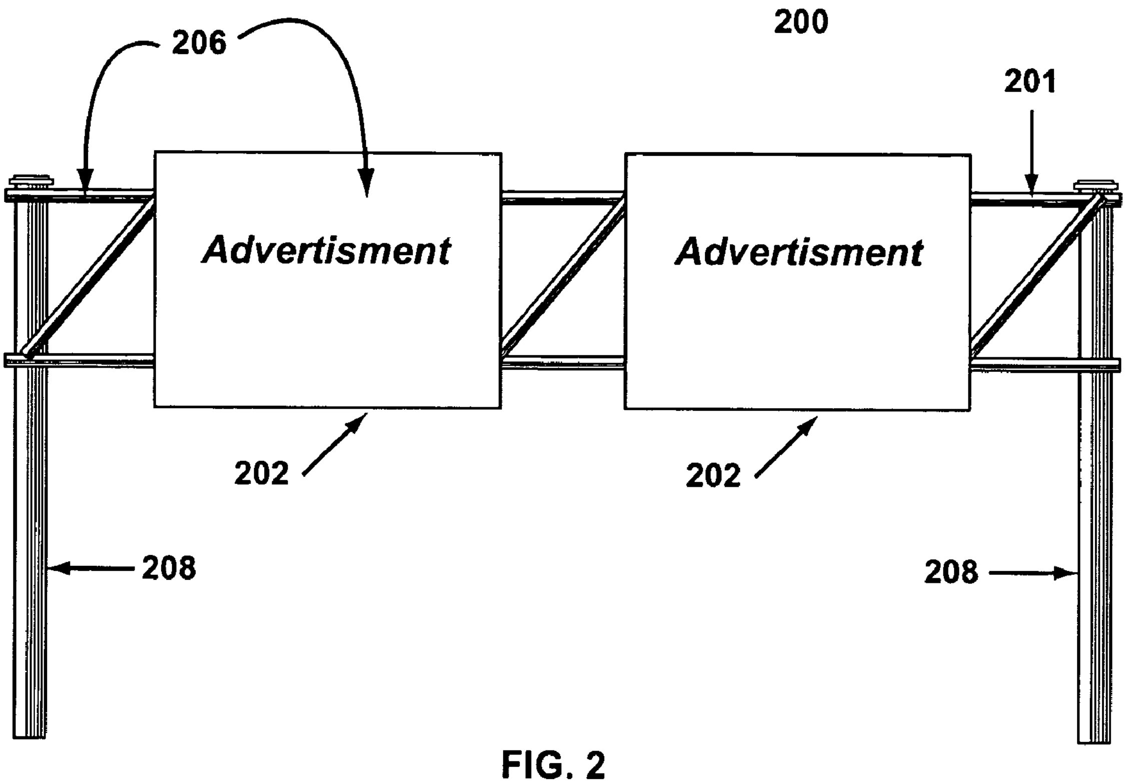
FIG. 2 shows the sign structure similar to FIGS. 1(*a*) and 1(*b*) but modified to include a billboard advertisement or message in accordance with an embodiment of the present invention.

In accordance with the present invention, FIG. 2 illustrates a billboard advertising system (200) that employs the unused rearward portion of the sign structure in FIG. 1(*b*) as an advertising means. The billboard advertising system includes an overhead sign structure (201) at least partially traversing a roadway. The overhead sign structure (201) has forward (204) and rearward (206) faces relative to oncoming vehicle traffic of the roadway. The forward face (204) of the sign structure may include traffic information (102), as described in FIG. 1(*a*). The traffic information may be part of a government regulated traffic information system directed in a primary orientation toward the oncoming vehicle traffic. The rearward face of the sign structure, shown in FIG. 1(*b*), has a secondary orientation directed at other traffic flow that is different from the oncoming vehicle traffic. In FIG. 2, one or more billboard advertisements (202) are positioned on the reward face (206) of the sign structure with visual exposure to the other traffic flow. FIG. 2 is an example of one embodiment, where the overhead traversing section of the overhead sign is supported by two lateral support beams (208). Overhead sign structures having two lateral support beams are common in large freeways, where it is necessary to post a large quantity of information.

Figure 3:
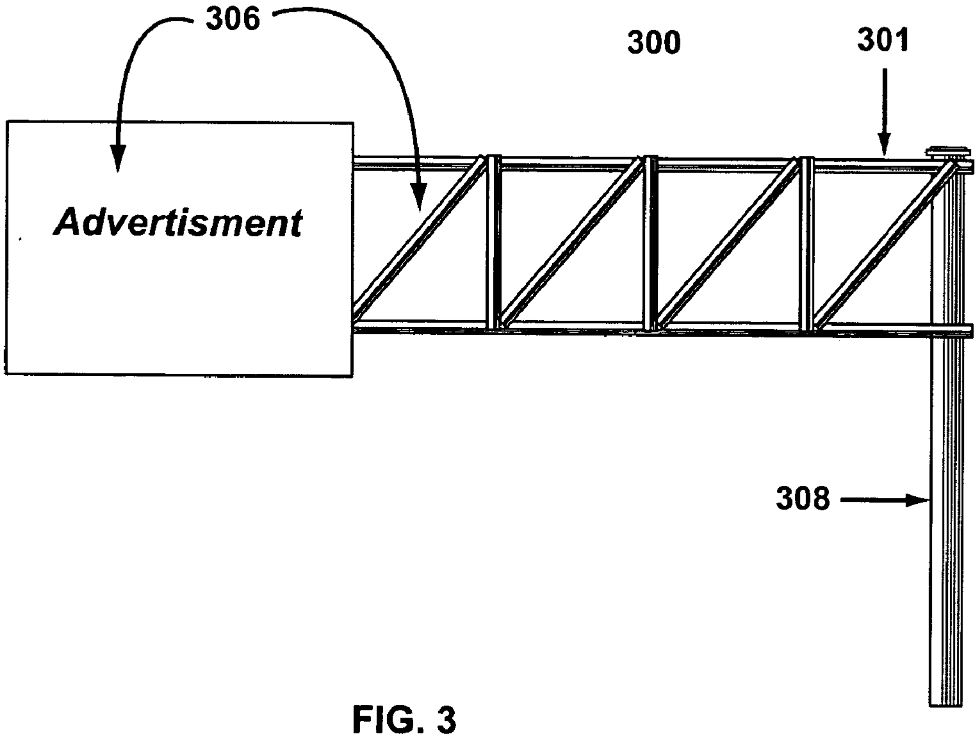
FIG. 3 shows a sign structure, supported by only one lateral support beam, including a billboard advertisement in accordance with an embodiment of the present invention.

In another embodiment, exemplified in FIG. 3, the overhead traversing section of the overhead sign (300) is supported by only one lateral support beam (308). Overhead sign structures of this type are commonly found on smaller freeways and highways, where it is unnecessary to support the overhead sign by more than one lateral support beam, or even on larger freeways where it is only necessary to post a limited amount of information. Often, only the forward face of the overhead sign structure (301) is used for posting traffic information. Instead of leaving the rearward face (306) of the overhead sign structure bare, and rather than constructing an entirely new sign support structure for a billboard advertisement, this invention suggests that the billboard advertisement (202) be posted on the rearward face (306).

Figure 4:
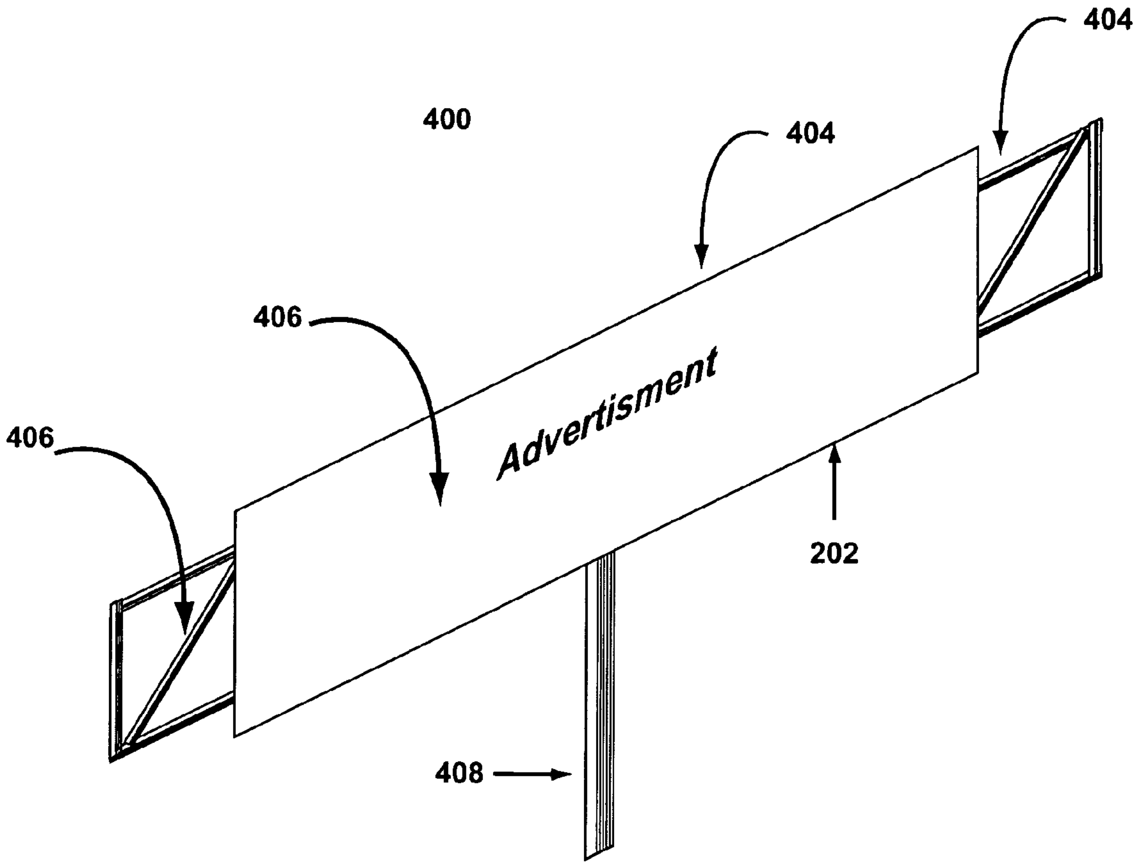
FIG. 4 shows another sign structure, supported by a center support beam, including a billboard advertisement or message in accordance with an embodiment of the present invention. The curved lines indicate the forward face in the orientation of the oncoming traffic flow in the case of (404), and the rearward or opposing face in the case of (406), where billboard advertisement or message on (406) is visible to traffic in a different orientation, including a backward orientation, or even a side or angled orientation, relative to the oncoming traffic flow.

In yet another embodiment, demonstrated in FIG. 4, the overhead traversing section of the overhead sign (400) is supported by a central support beam (408). Overhead sign structures of this type are commonly found posted in between opposing directions of traffic of a highway or freeway. Often, only the forward face (404) of the overhead sign structure is used for traffic information. Instead of leaving the rearward face (406) of the overhead sign structure bare, and rather than constructing an entirely new sign support structure for a billboard advertisement, this invention suggests that the billboard advertisement (202) be posted on the rearward face (406).

The present invention focuses primarily on advertising along high-speed roadways and other areas where the surrounding area is prone to the construction of additional sign support structures for billboard advertisements. Examples of high-speed roadways include, but may not be limited to, expressways, freeways, highways, roads wherein speed limits associated with the roadway are at least 50 miles per hour, and roads wherein speed limits associated with the roadway are predominantly 45 miles per hour or more.

Because vehicles will likely be traveling at high speeds in the areas where the billboard advertising systems of this invention may be posted, it may be necessary for the billboard advertisements to be quite large in comparison to small-sign advertising where traffic speeds are slow. In one embodiment of the invention, the billboard size may be at least nine square feet. In another embodiment of the invention, the billboard size may be at least fifteen square feet, including any range of sizes up to about 500 square feet.

Figure 5:
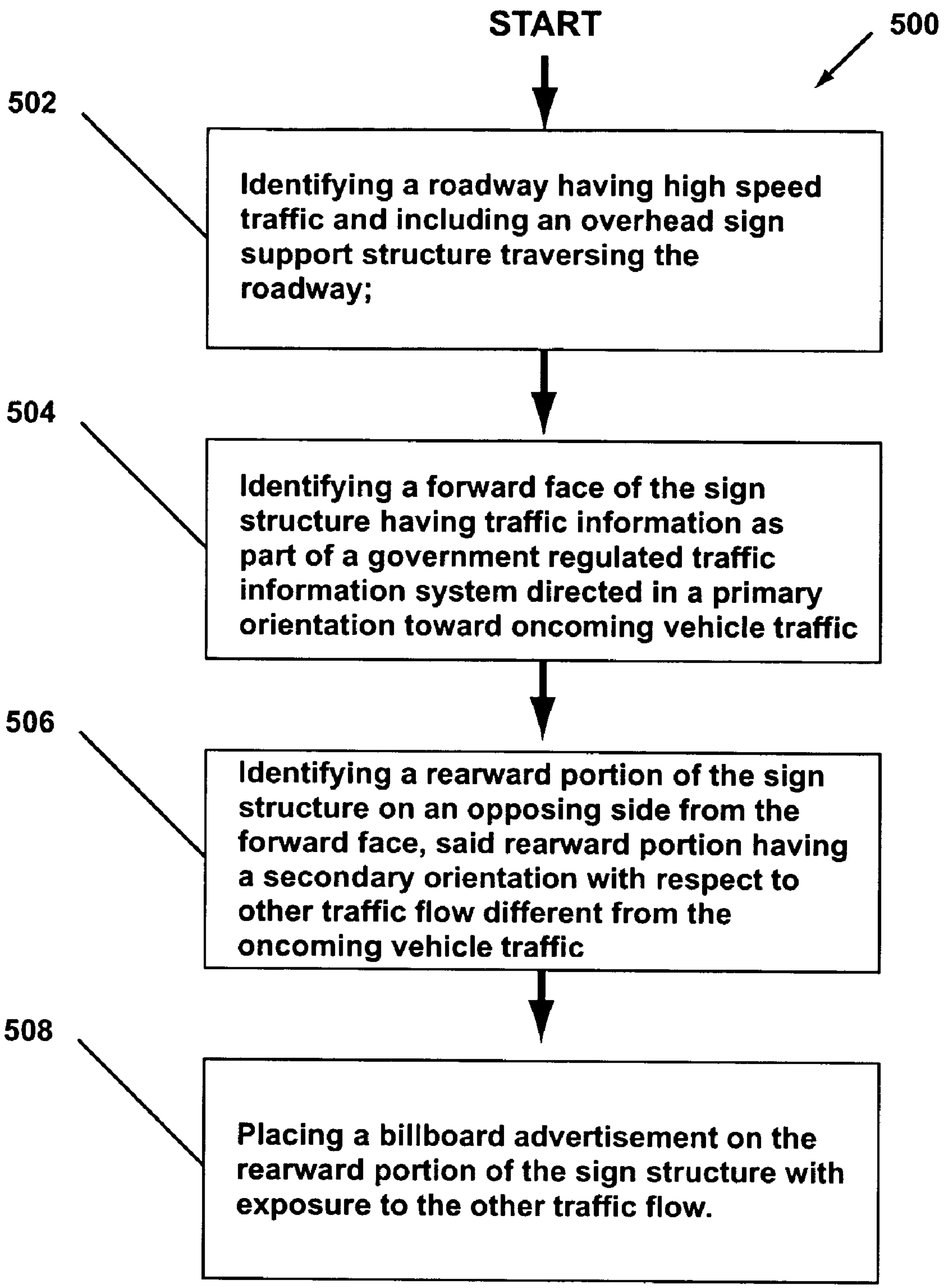
FIG. 5 provides a block description of a method in accordance with one embodiment of the present invention.

As illustrated in FIG. 5, and in accordance with an embodiment of the invention, a method of billboard advertising (500) is disclosed. First, a roadway having high-speed traffic and including an overhead sign structure at least partially traversing the roadway is identified (502). Second, a forward face of the sign structure having traffic information as part of a government regulated traffic information system directed in a primary orientation toward oncoming vehicle traffic is identified (504). Third, a rearward portion of the sign structure on an opposing side from the forward face is identified (506). The rearward portion may have a secondary orientation with respect to other traffic flow different from the oncoming vehicle traffic. Finally, a billboard advertisement is placed (508) on the rearward portion of the sign structure with exposure to the other traffic flow.

The secondary orientation of the rearward portion in the above method may be directed toward opposing oncoming traffic of an adjacent traffic lane. Alternatively the secondary orientation may be directed toward oncoming traffic that has passed under the sign structure and has exposure to the billboard in a rearward orientation.

In one embodiment of the method of the invention, the information on the billboard may be inverted as a mirror image, enabling normal viewing through a rearview mirror of the vehicle traffic.

Figure 6:
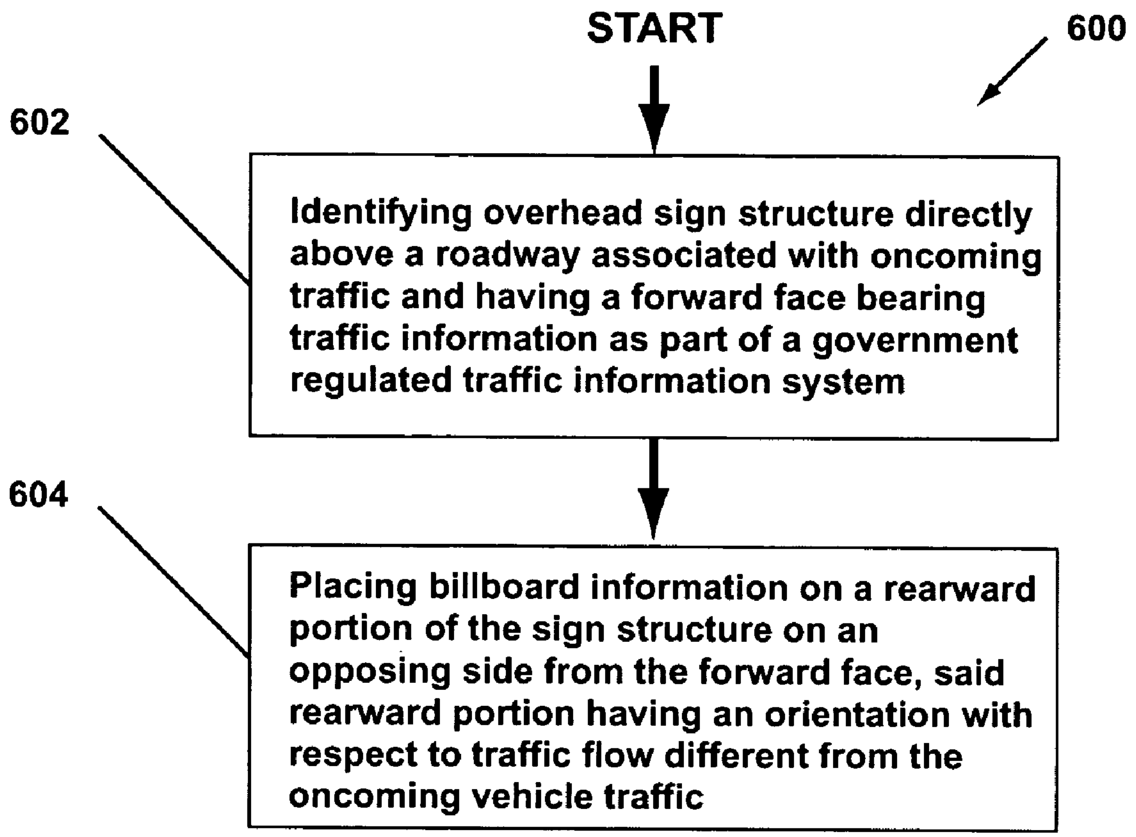
FIG. 6 illustrates an additional block description of a second embodiment of the present invention.

As illustrated in FIG. 6 and in accordance with another embodiment of the invention, a method of advertising (600) is disclosed. First, an overhead sign structure at least partially traversing a roadway associated with oncoming vehicle traffic and having a forward face bearing traffic information as part of a government regulated traffic information system is identified (602). Second, billboard information is placed (604) on a rearward portion of the sign structure on an opposing side from the forward face, said rearward portion having an orientation with respect to traffic flow different from the oncoming vehicle traffic.

The above system and methods successfully meet the demands of an economy, which depends on the use of billboards on high-speed roadways as well as the desire of communities to minimize the detrimental environmental impact caused by sign structures used for the sole purpose of posting billboards. The present invention accomplishes this by eliminating the need for separate sign structures for billboards in areas where overhead sign structures are prevalent by posting billboards on existing overhead highway sign structures, while maintaining the rights of billboard companies to post their advertisements. Furthermore, many of the rearward faces of the existing overhead highway sign structures are in more direct line of sight for drivers than are the separate sign structures for billboards, thus providing a benefit to billboard companies and advertisers over the existing billboard structures. As an additional benefit of the invention, local and state governments who own the existing overhead highway signs may be able to raise additional revenues for the city, county and state by leasing the rearward portions of their signs to private organizations who wish to use them for advertising in accordance with the present invention. The methods and advantages of the invention and particularly the use within the United States has not been previously described or suggested.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of billboard advertising, comprising the steps of:

a. identifying a roadway having an overhead sign structure at least partially traversing the roadway, wherein the overhead sign structure has a forward face directed in a primary orientation toward oncoming vehicle traffic and bearing traffic information as part of a government regulated traffic information system and a rearward portion on an opposing side from the forward face; and b. placing a billboard advertisement on the rearward portion of the overhead sign structure, whereby the advertisement on the rearward portion is capable of being seen by traffic, and wherein the advertisement contains at least some information on the billboard as a mirror image enabling normal viewing through a rearview mirror of traffic.

2. The method of claim 1, wherein an overhead traversing section of the overhead sign structure is supported by at least a central support beam.

3. The method of claim 1, wherein an overhead traversing section of the overhead sign structure is supported by at least one lateral support beam.

4. The method of claim 1, wherein the roadway is an expressway or a freeway.

5. The method of claim 1, wherein speed limits associated with the roadway are about 45 miles per hour or higher.

6. The method of claim 1, wherein the rearward portion is directed toward oncoming traffic of an adjacent lane of the roadway.

7. The method of claim 1, wherein the rearward portion is directed toward oncoming traffic of a different, nearby roadway.

8. The method of claim 1, wherein the overhead sign comprises a securely fastened frame to affix the advertisement, the frame allowing the advertisement or message to be placed on the rearward portion of the overhead sign, and wherein the frame allows the insertion or replacement of the advertisement without removing the frame.

9. The method of claim 8, wherein the advertisement is present on the surface of a replaceable product.

10. The method of claim 9, wherein the advertisement is placed on a vinyl, plastic, partially plastic, or canvas surface.

11. The method of claim 1, wherein the advertisement is displayed from an electronic screen.

12. The method of claim 11, wherein the image on the electronic screen is controlled remotely.

13. A method of advertising, comprising the steps of:

a. identifying an overhead sign structure at least partially traversing a roadway associated with oncoming vehicle traffic and having a forward face bearing traffic information as part of a government regulated traffic information system;

b. affixing a securely fastened frame on a rearward portion of the overhead sign structure on an opposing side from the forward face; and c. connecting the billboard advertisement to the frame affixed to the rearward portion of the overhead sign structure, said billboard advertisement being visible to traffic flow different from the oncoming vehicle traffic or visible from an orientation different from that of the oncoming vehicle traffic, and wherein said advertisement contains at least some information as a mirror image enabling normal viewing through a rearview mirror of traffic.

14. The method of claim 13, further comprising remotely controlling the content of the advertisement.

15. The method of claim 13, further comprising replacing the advertisement connected to the frame.

16. The method of claim 13, wherein the advertisement is placed on a vinyl, plastic, partially plastic, or canvas surface.

17. A billboard advertising system, comprising:

a. an overhead sign structure at least partially traversing a roadway, said overhead sign structure having forward and rearward faces relative to oncoming vehicle traffic of the roadway;

b. the forward face of the overhead sign structure having traffic information as part of a government regulated traffic information system directed in a primary orientation toward the oncoming vehicle traffic;

c. the rearward face of the overhead sign structure on an opposing side from the forward face having a secondary orientation with respect to other traffic flow different from the oncoming vehicle traffic; and d. a billboard advertisement positioned on the rearward face of the overhead sign structure, an wherein said advertisement contains at least some information as a mirror image enabling normal viewing through a rearview mirror of traffic.

18. The system of claim 17, wherein the advertisement can be replaced.

19. The system of claim 18, wherein the advertisement is displayed from an electronic screen.

* * * * *